(12) United States Patent
Bruck et al.

(10) Patent No.: US 8,132,710 B2
(45) Date of Patent: Mar. 13, 2012

(54) DECONSTRUCTABLE ASSEMBLY AND METHOD

(75) Inventors: Gerald J. Bruck, Oviedo, FL (US); Douglas A. Arrell, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 353 days.

(21) Appl. No.: 12/194,900

(22) Filed: Aug. 20, 2008

(65) Prior Publication Data

US 2010/0044417 A1 Feb. 25, 2010

(51) Int. Cl.
*B23K 1/018* (2006.01)
(52) U.S. Cl. ............ 228/264; 428/686; 29/426.5
(58) Field of Classification Search ............ 228/264; 428/576, 591, 686; 29/426.1, 426.4, 426.5, 29/426.6
See application file for complete search history.

(56) References Cited

U.S. PATENT DOCUMENTS 3,600,144 A * 8/1971 Csakvary .............. 428/620
7,308,999 B2 * 12/2007 Fujii et al. .............. 228/4.1

* cited by examiner

*Primary Examiner* — Jessica L Ward
*Assistant Examiner* — Nicholas D'Aniello

(57) ABSTRACT

An assembly (10) that can be both joined and parted by temperature processing. A parting member (20) captured between two members of the assembly exhibits a state change as a function of temperature such that the two members can be joined with a meltable joining material (18) at a joining temperature, operated at an operating temperature lower than the joining temperature, and then separated at a parting temperature higher or lower than the operating and joining temperatures as a result of a parting force caused by the state change of the parting member. In one embodiment, the parting member has a coefficient of thermal expansion higher than a coefficient of thermal expansion of the assembly members such that differential thermal expansion causes the parting member to expand across the interface (16) between the members to generate the parting force.

9 Claims, 3 Drawing Sheets

DECONSTRUCTABLE ASSEMBLY AND METHOD

FIELD OF THE INVENTION

This invention relates generally to the field of metals joining, and more specifically to a deconstructable assembly and method for assembly and disassembly via high temperature processing.

BACKGROUND OF THE INVENTION

Vacuum brazed or soldered assemblies offer superior advantages to conventional brazing or soldering, such as: flux-free joints, high strength and integrity of the joint, and the ability to heat-treat or age-harden the assemblies while simultaneously performing the joining process. Excess flux may cause corrosion over time, so a process that offers flux-free joining has an advantage in that there is no flux to remove after joining. However, vacuum brazing or soldering may be expensive due to the process being performed inside of a vacuum chamber vessel. In addition, vacuum brazed or soldered assemblies face a unique challenge of disassembly when retrofitting or repair is necessary.

The American Welding Society defines brazing as a joining process wherein a non-ferrous joining material or alloy is heated to a melting temperature above 842° F. (450° C.) and distributed between two or more close-fitting parts by capillary action. The joining material and a flux interact with a thin layer of the base material. When cooled, the joint is especially strong due to grain structure interaction. The American Welding Society defines soldering as a process whereby two or more metal components are joined together by melting and flowing a filler metal into the joint, the filler material having a melting point lower than a brazing material.

High temperature assemblies that are joined through vacuum brazing are especially difficult to disassemble for repair or retrofit. A vacuum brazed assembly is difficult to disassemble because introducing mechanical loading through the vacuum chamber walls to pull the pieces apart is problematic. Alternatively, such assemblies might be loaded by weights within the chamber and rely on gravity to disengage elements. The design of the assembly may require lateral loading to disengage. Loading by lateral cables and pulleys in a high temperature vacuum environment is extremely complex and difficult.

BRIEF DESCRIPTION OF THE DRAWINGS

The invention is explained in the following description in view of the drawings that show.

DETAILED DESCRIPTION OF THE INVENTION

The present invention provides an improved assembly, and a method of joining such an assembly, whereby two component parts or members may be joined together at a joining temperature with a meltable joining material, such as a braze or solder material, and whereby the joined component parts may be subsequently separated by exposing the assembly to a parting temperature that is higher than the joining temperature. This is accomplished by disposing a parting member between opposed surfaces of the respective component parts when the assembly is formed, with the parting member being formed of a material that exhibits a state change at the parting temperature. The state change causes the parting member to exert a parting force between the opposed surfaces sufficient effective to separate the two component parts at the parting temperature.

Figure 1:
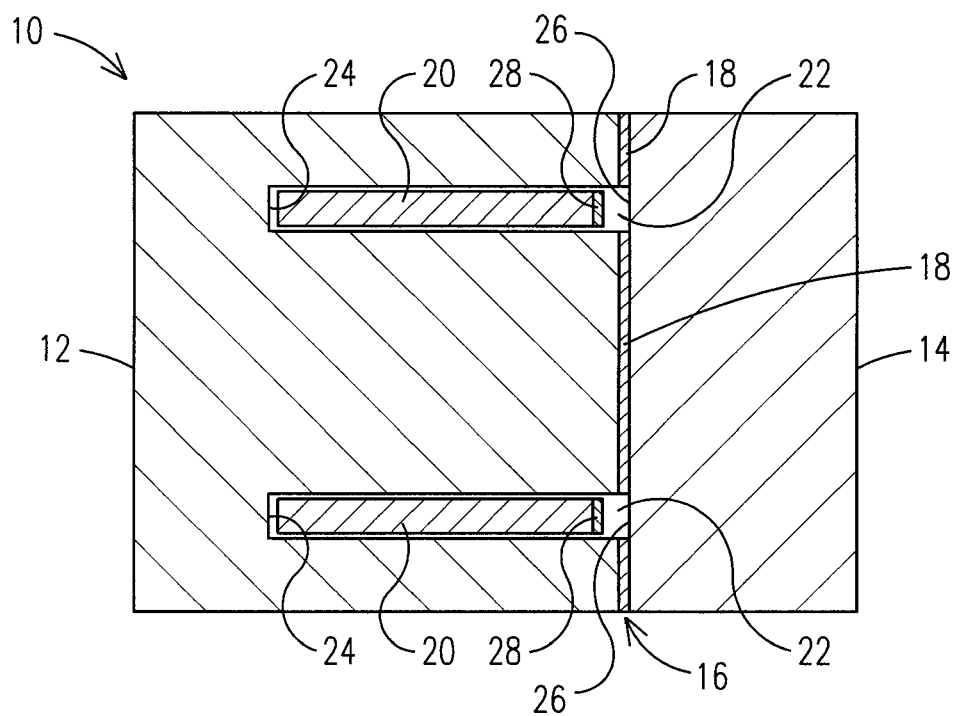
FIG. 1 is a schematic illustration of a deconstructable assembly in accordance with a first embodiment of the invention.

FIG. 1 illustrates a first embodiment of the invention wherein an assembly 10 is formed by joining a first component 12 to a second component 14 at an interface 16 with a meltable joining material 18, for example a braze material. At least one parting member is captured within the assembly upon joining of the first and second components 12, 14 together. FIG. 1 illustrates two parting members as pins 20, with each pin 20 being disposed in a respective cavity 22 formed in the first member 12. Each pin 20 extends axially between opposed surfaces 24, 26 of the first and second members 12, 14 respectively. Optionally, a braze stop material 26 may be used on the pins 20 to prevent the joining material 18 from attaching to the pins 20.

The assembly 10 of FIG. 1 may be joined by a method such as vacuum brazing, whereby the assembly 10 is heated to a joining temperature sufficiently high to melt the joining material 18, such that subsequent cooling of the assembly results in solidification of the joining material 18 and physical attachment of the first component 12 to the second component 14 along the interface 16. Subsequently, the assembly 10 may be used at an operating temperature that is below the melting temperature of the joining material 18.

The assembly 10 of FIG. 1 may be parted simply by exposing the assembly 10 to a parting temperature that is higher than the joining temperature. This is accomplished by forming the parting members 20 of a material that will exhibit a state change at the parting temperature, whereby the state change causes the parting members 20 to exert a parting force between the opposed surfaces 24, 26 to break the interface 16 and to separate the two components 12, 14. In the embodiment of FIG. 1, pins 20 are selected to have a coefficient of thermal expansion that is higher than a coefficient of thermal expansion of the first component 12, and the state change is differential thermal expansion between there between. At and below the joining temperature, the pins 20 do not contact the second member 14. However, at the parting temperature, pins 20 exhibit adequate thermal growth in the axial direction such that they contact the opposed surface 26 of the second member 14, thereby exerting a parting force between the first and second components 12, 14. The pins may exert the parting force into the first component 12 via surface 24 and/or by friction along the pin length, depending upon the tolerance of the fit of the pin 20 within the cavity 22. The joining material 18 is melted at the parting temperature, and the parting force is sufficient to cause separation of the components 12, 14 without the need for any mechanical force otherwise to be applied to the components 12, 14. Thus, the assembly 10 can be parted inside a vacuum furnace without the need for the complex and expensive mechanisms that would otherwise have to be used with prior art assemblies.

Figure 2A:
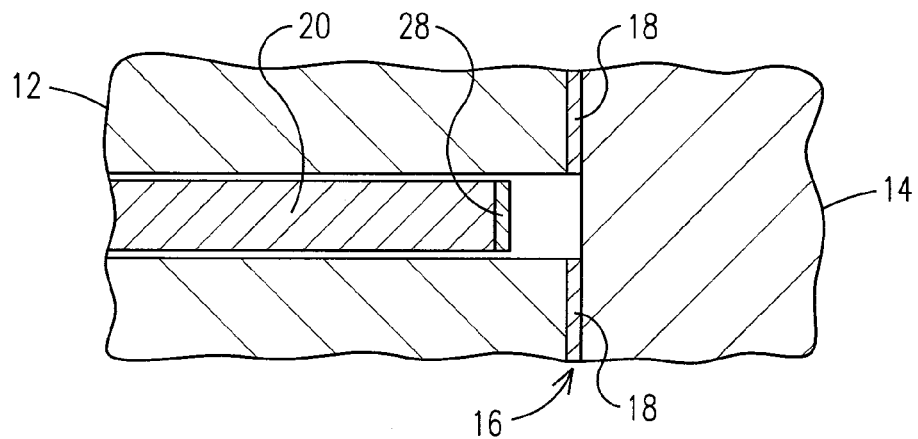
FIGS. 2a-2e are schematic illustrations of the steps of a method of joining and parting an assembly in accordance with an embodiment of the invention.

Steps of a method in accordance with the present invention are more clearly illustrated by viewing FIGS. 2a-2e. In FIG. 2a the components 12, 14 are in position at room temperature in preparation for being joined by joining material 18. Pin 20 has an axial length at this temperature such that it does not contact surface 26 of component 14.

Figure 2B:
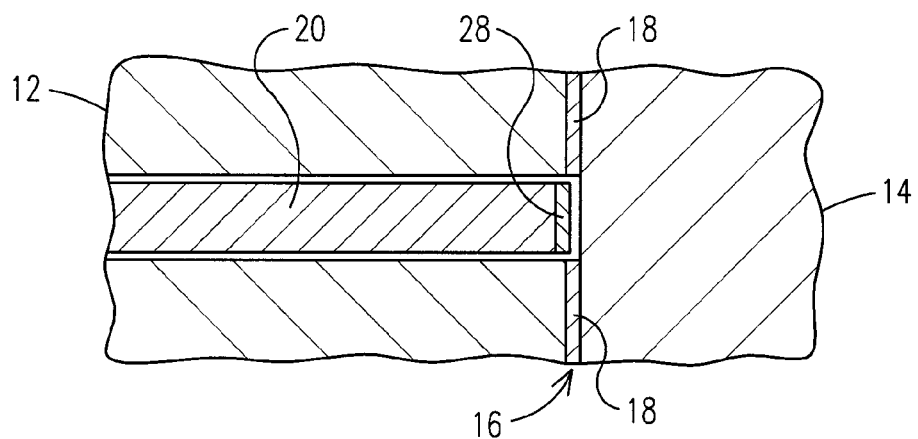

FIG. 2b illustrates a condition of the assembly 10 at the joining temperature, where the joining material 18 is melted and flows to create the interface 16. The pin 20 exhibits differential thermal growth relative to the first component 12 at this temperature whereby it still does not contact the second component 14, although it may have grown to become very close to the surface 26, whereby the braze stop material 28 prevents any attachment there between.

Figure 2C:
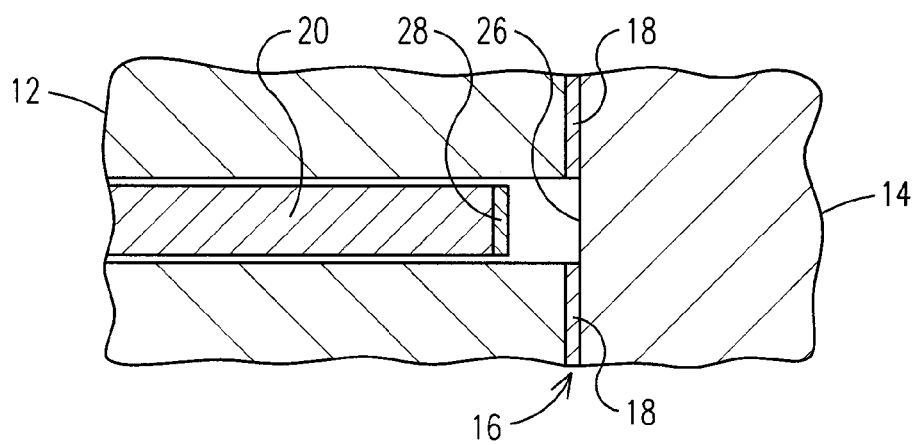

FIG. 2c illustrates a condition of the assembly 10 at room or operating temperature after the components 12, 14 are joined to form assembly 10. Here again, pin 20 remains short of surface 26.

Figure 2D:
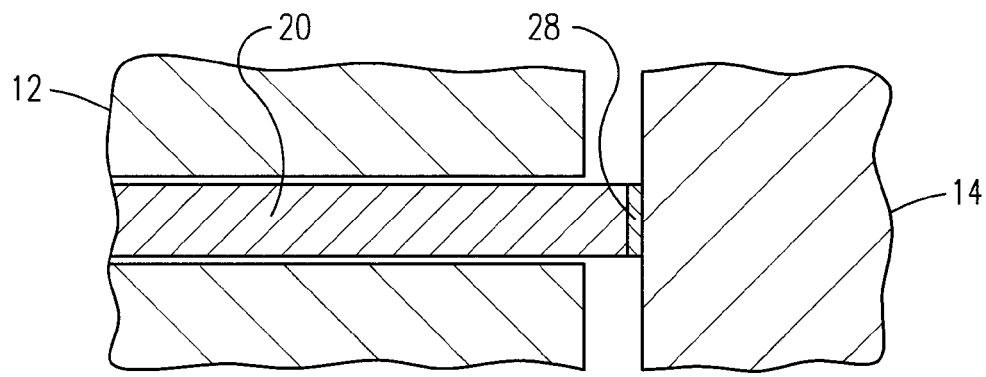

FIG. 2d illustrates a condition of the assembly 10 during a disassembly operation at a parting temperature that is higher than the joining temperature. At this temperature, the pin 20 has grown relative to the first component 12 such that it contacts and exerts a parting force against surface 26, thereby breaking the interface 16 and mechanically separating the first and second components 12, 14.

Figure 2E:
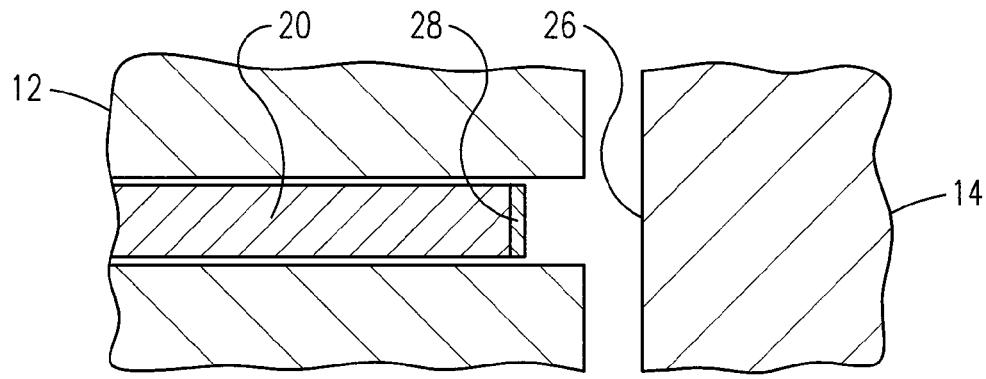

FIG. 2e illustrates a condition of the disassembled assembly 10 at room temperature.

Figure 3:
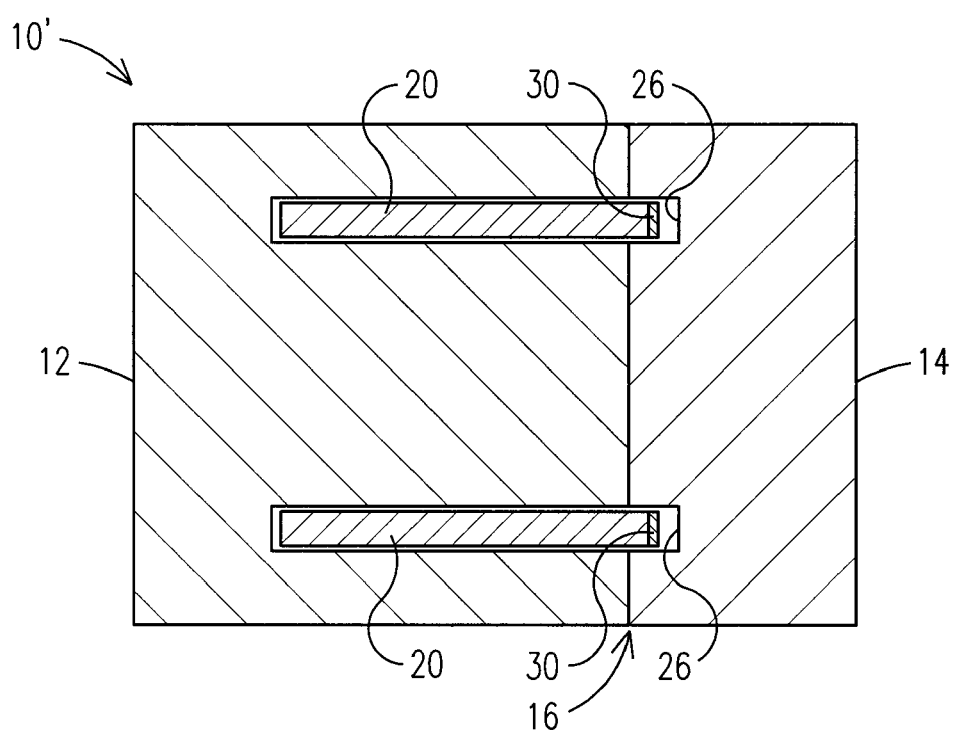
FIG. 3 is a schematic illustration of a deconstructable assembly in accordance with a second embodiment of the invention.

FIG. 3 illustrates another embodiment of the present invention where the assembly 10' includes parting members (pins 20) that extend across the interface 16 at room and operating temperatures and into respective cavities formed in the second component 14. This embodiment allows for the parting members to support the interface 16 in the shear direction, i.e. parallel to the interface 16. The pins 20 function in this embodiment in a manner similar to that of FIG. 1 by growing axially to make contact with surface 26 at the parting temperature. Cavity 30 may be somewhat oversized relative to the pin 20 such that no force is exerted into the second component 14 due to friction along the axial length of the pin 20, but rather, the force may be applied only upon contact between the pin 20 and the surface 26.

Figure 4:
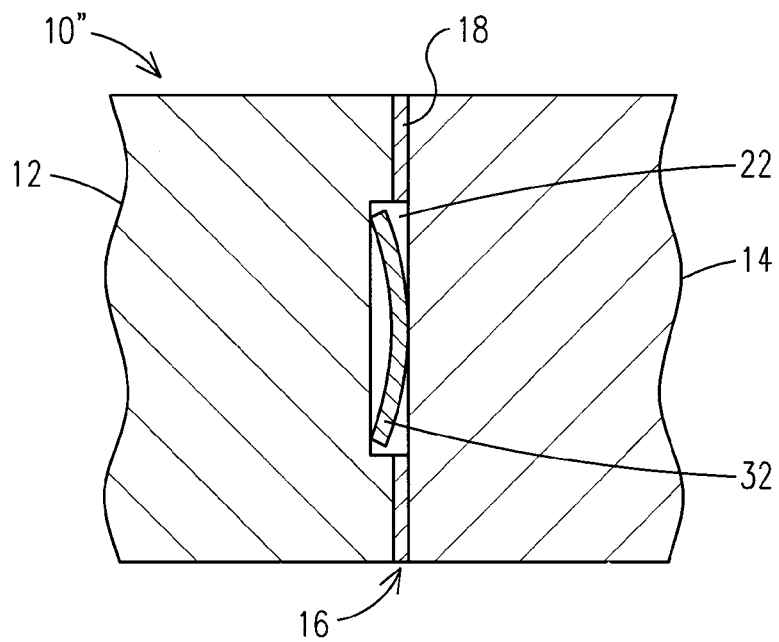
FIG. 4 is a schematic illustration of a deconstructable apparatus in accordance with a third embodiment of the invention.

The state change utilized to provide the parting force is not necessarily limited to differential thermal expansion, as described above. FIG. 4 illustrates an embodiment of the invention wherein an alternative form of parting member 32 is disposed within the assembly 10", such as within cavity 22. Alternative forms of parting member 32 may exert a parting force between the first and second components 12, 14 at the parting temperature via any number of state change mechanisms. In one embodiment, parting member 32 may be formed of a bimetallic material such that it exhibits a change of shape (e.g. curvature) upon reaching the parting temperature that is adequate to create the desired parting force. In another embodiment, the parting member 32 may be formed of a material that converts to or expels a gas at the parting temperature in a quantity sufficient to raise the pressure in cavity 22 to a desired pressure to create the parting force. For example, solid red phosphorous may be disposed within a cavity within an assembly soldered at 400° C. Upon reheating the assembly above 417° C., the red phosphorous sublimes and creates a gaseous pressure to part the assembly. Alternately, solid magnesium may be disposed within an assembly brazed at 500° C. Upon reheating above 649° C., the magnesium melts or above 1090° C. vaporizes and exerts a force to part the assembly. Water may also be used as the parting member 32 by taking advantage of a state change to either steam or ice at the parting temperature, which may be either above or below an operating temperature of the assembly. For example, components 12 and 14 may be brazed or soldered together with cavity 22 being empty but retaining an access to the exterior of the assembly. Cavity 22 is then filled with water and sealed, such as with a threaded cap. Upon cooling the assembly to a parting temperature below 0° C., the water freezes and expands, causing the relatively weak interface to break and part the assembly. In this embodiment, the joining material is not melted but rather it fails due to the mechanical loads exerted by the expanding water/ice volume. Alternatively, the assembly could be heated to a parting temperature above 100° C. to boil the water to create a parting pressure in the cavity 22, with the parting temperature being either below or above the melting temperature of the joining material.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An assembly comprising:
   a first component comprising a cavity;
   a second component joined to the first component at an interface of the first component and the second component;
   a meltable joining compound applied to and joining a portion of a surface of the first component and a portion of a surface of the second component; and
   a parting member at least partially disposed within the cavity and extending toward the second component, wherein a coefficient of thermal expansion of the parting member is greater than a coefficient of thermal expansion of the first component such that differential thermal expansion there between causes the parting member to exert a parting force which separates the joined portions of the surfaces of the first and second components at a parting temperature above a melting temperature of the joining compound but does not cause the parting force between the first and second components at an operating temperature below the melting temperature of the joining compound.

2. An assembly according to claim 1, wherein the parting member extends beyond the interface and into a recess of the second component at the operating temperature creating a mechanical interference between the parting member and the second component, thereby supporting the interface in shear.

3. An assembly according to claim 1, wherein the joining compound comprises a braze compound and the parting member comprises a straight pin that expands along a longitudinal axis of the pin.

4. An assembly comprising:
   a joined portion of a surface of a first member joined by a joining material to a joined portion of a surface of a second member along an interface; and
   a parting member disposed between respective portions of the first and second members, the parting member exhibiting a state change as a function of temperature, such that at a parting temperature that is above a melting temperature of the joining material the parting member will exert a parting force between the first and second members which separates the joined portion of the surface of the first member from the joined portion of the surface of the second member and thereby part the first and second members.

5. An assembly according to claim 4, further comprising:
   the parting member comprising a first axial end disposed within a cavity formed in the first member and an opposed second axial end projecting toward the second member but not making contact with the second member at an operating temperature; and a coefficient of thermal expansion of the parting member being greater than a coefficient of thermal expansion of the first member such that the state change comprises differential thermal expansion there between, wherein the parting member expands to make contact with the second member at the parting temperature above the operating temperature and above a melting temperature of the joining material to exert the parting force.

6. An assembly according to claim 5, further comprising:

the parting member extending axially across the interface and into a cavity formed in the second member but not making contact with an opposed surface of the second member at the operating temperature, thereby effective to provide shear support for the interface at the operating temperature; and the parting member expanding axially to make contact with the opposed surface of the second member at the parting temperature, thereby providing the parting force at the parting temperature.

7. An assembly according to claim 4, wherein the parting member comprises a bimetallic member and the state change comprises a change in shape of the parting member effective to exert the parting force at the parting temperature above a melting temperature of the joining material.

8. An assembly according to claim 4, wherein the parting member comprises a material selected to convert to a gas or to release a gas at the parting temperature above a melting temperature of the joining material in a quantity effective to create a pressure resulting in the parting force at the parting temperature.

9. An assembly according to claim 4, wherein the joining material comprises a braze material, and further comprising a braze stop material disposed on the parting member.

* * * * *